United States Patent [19]
Baker et al.

[11] Patent Number: 5,583,561
[45] Date of Patent: Dec. 10, 1996

[54] MULTI-CAST DIGITAL VIDEO DATA SERVER USING SYNCHRONIZATION GROUPS

[75] Inventors: Donn B. Baker, Minneapolis; David R. Johnson, Oakdale; Ralph E. Sipple, Shoreview, all of Minn.

[73] Assignee: Unisys Corporation, Blue Bell, Pa.

[21] Appl. No.: 255,014

[22] Filed: Jun. 7, 1994

[51] Int. Cl.$^6$ .................................................. H04N 7/173
[52] U.S. Cl. ........................... 348/7; 348/12; 395/200.09; 395/601; 370/390
[58] Field of Search ............................... 348/6, 7, 12, 13; 370/60, 60.1, 61, 91, 92, 93, 94.1, 94.2, 94.3; 455/3.1, 4.1, 4.2, 5.1; 395/200.08, 200.09, 200.01, 600; H04N 7/10, 7/173, 7/16, 7/13

[56] References Cited

U.S. PATENT DOCUMENTS

| | | | |
|---|---|---|---|
| 4,381,522 | 4/1983 | Lambert | 358/86 |
| 4,506,387 | 3/1985 | Walter | 455/612 |
| 4,761,684 | 8/1988 | Clark et al. | 358/86 |
| 4,763,317 | 8/1988 | Lehman et al. | 370/58 |
| 4,829,372 | 5/1989 | McCalley et al. | 358/86 |
| 4,949,187 | 8/1990 | Cohen | 358/335 |
| 4,963,995 | 10/1990 | Lang | 358/335 |
| 4,995,078 | 2/1991 | Monslow et al. | 380/10 |
| 5,014,125 | 5/1991 | Pocock et al. | 358/86 |
| 5,057,932 | 10/1991 | Lang | 358/335 |
| 5,130,792 | 7/1992 | Tindell et al. | 358/85 |
| 5,132,992 | 7/1992 | Yurt et al. | 375/122 |
| 5,168,353 | 12/1992 | Walker et al. | 358/86 |
| 5,172,413 | 12/1992 | Bradley et al. | 380/20 |
| 5,206,722 | 4/1993 | Kwan | 358/86 |
| 5,247,347 | 9/1993 | Litteral et al. | 358/85 |
| 5,253,275 | 10/1993 | Yurt et al. | 375/122 |
| 5,262,875 | 11/1993 | Mincer et al. | 358/335 |
| 5,291,554 | 3/1994 | Morales | 380/5 |
| 5,305,438 | 4/1994 | Mackay et al. | 395/164 |
| 5,414,455 | 5/1995 | Hooper et al. | 348/7 |
| 5,442,389 | 8/1995 | Blahut et al. | |
| 5,442,390 | 8/1995 | Hooper et al. | |
| 5,446,490 | 8/1995 | Blahut et al. | |

FOREIGN PATENT DOCUMENTS

| | | | |
|---|---|---|---|
| 0396062 | 11/1990 | European Pat. Off. | |
| 0605115 | 7/1994 | European Pat. Off. | H04N 7/173 |
| 0617563 | 9/1994 | European Pat. Off. | 348/7 |
| 0167544 | 7/1993 | Japan | H04N 7/173 |
| 0003112 | 3/1991 | WIPO | |
| 0012599 | 7/1992 | WIPO | |
| 0016557 | 8/1993 | WIPO | |

OTHER PUBLICATIONS

Sinceski W. D. "System architecture for a large scale video on demand service" Computer Networks and ISDN Systems 22(1991) 155–162.

Bianchini Jr. et al. "Design of a Nonblocking Shared–Memory Copy Network for ATM" INFOCOM '92, 1992 IEEE 0876–0885.

Communications–Rising to the Heights Denver Jun. 23–26 1991 vol. 2 of 3 IEEE pp. 842–846, "A Store–&–Forward Architecture for Video–on– . . . ".

(List continued on next page.)

Primary Examiner—David E. Harvey
Attorney, Agent, or Firm—Charles A. Johnson; Mark T. Starr

[57] ABSTRACT

A system and method for distributing real-time, compressed, digital video data from a video library composed of multiple mass storage devices through a digital video data server to large numbers of viewers via distribution networks is provided. The server obtains selected frames of video data for viewer-requested programs from high-speed memory using a buffering strategy, replicates the data via a multi-cast technique for each viewer listed in an assigned synchronization group and forwards the data to each viewer's site where it is decompressed, decoded, and converted for display on a television monitor or computer display. Each viewer maintains interactive control over the transmission of the digital video data.

59 Claims, 8 Drawing Sheets

OTHER PUBLICATIONS

1992 IEEE ICCE vol. 38 No. 3, 2 Jun. 1992–7 Jun. 1992 pp. 319–324, "Prioritazation & Transport in the ADTV Digital Simulcast System".

James R. Allen, et al., "VCTV: A Video–On–Demand Market Test", ATT Technical Journal, Jan./Feb. 1993, pp. 7–14.

Bryan D. Ackland, et al., "A Video–Codec Chip Set for Multimedia Applications", ATT Technical Journal, Jan./Feb 1993, pp. 50–66.

Didier Le Gall, "Digital Image and Video Standards", Comm. of the ACM, Apr. 1991, pp. 47–58.

Kevin Harney, et al., "Hardware for Video Encoding and Decoding", Comm. of the ACM, Apr. 1991, pp. 65–78.

Liebhold, et al., "Future Standards" Comm. of the ACM, Apr. 1991, pp. 104–111.

Fouad A. Tobagi et al., "Client–Server Challenges for Digital Video", Compcon 1992 Proceedings, pp. 88–91.

Yasushiko Watanabe et al., "Experimental Digital Video/Audio Storage Server", CG Int'l 1992 Proceedings, pp. 883–893.

Larry Press, "The Internet and Interactive Television" Comm. of the ACM, Dec. 1993, pp. 19–23, 140.

MULTI-CAST DIGITAL VIDEO DATA SERVER USING SYNCHRONIZATION GROUPS

BACKGROUND OF THE INVENTION

1. Field of the Invention

This invention relates generally to video data transmission systems and specifically to a video-on-demand system controlled by viewers in real-time. More particularly, it relates to the interactive delivery of digital video data on demand from a video library which is referenced by a digital video data server for real-time distribution to multiple display systems controlled by viewers.

2. Background Information

Distribution of full motion video data has evolved from the earliest days of television broadcasting to meet viewer demand and respond to technological change. The original method of video data distribution in early television demonstrations used point-to-point wiring between a camera and a video monitor. This method employed a single program controlled entirely by the person operating the camera. This was followed shortly thereafter by broadcast stations transmitting fixed schedules of programming to the public via Ultra-High Frequency (UHF) and Very-High Frequency (VHF) television channels. The number of broadcast channels was limited, however, both by government regulation and the physics of over-the-air broadcast technology. In time, an emerging cable television industry distributed a greater number of programs on many more channels over dedicated land lines or microwave satellites to viewers. The number of possible programs to view went up, but control over the content and timing of the programming was in the hands of the cable television companies, not the viewers. In the last fifteen years, the widespread use of video cassette recorders (VCRs) has changed the viewing habits and control capabilities of viewers. With a VCR, a viewer has complete control over the content and timing of what he/she is viewing. However, using a VCR to control program viewing has some inherent problems. The viewer must either record a broadcast program for later viewing or venture out to the video store to select and obtain the desired program's cassette. The later requires a second trip to the video store to return the cassette after viewing the program. Viewer selection may be frustrated if the desired program is unavailable because all copies of the program are already rented, the program is not in the store's stock, or the store is closed.

In order to solve some of the problems associated with the cable and video cassette rental technologies, various video-on-demand (VOD) or programming-on-demand systems have been proposed to provide viewers with the timing and content control of a VCR coupled with the convenience of a cable system. In Walter, U.S. Pat. No. 4,506,387, a programming-on-demand cable system is disclosed which allows a viewer to select a program to view from a library of programs. The selected program is transmitted at a high, non-real-time rate over a dedicated fiber optic line to a receiving station at the viewer's location. This system allows a viewer to select a start time for a selected program at any time after the selected program has been received, but does not provide the capability for other VCR-type controls such as pause, rewind, fast-forward, or stop. The transmission station must be equipped to transmit the selected program to the viewer's site in non-real-time.

In Monslow, et. al., U.S. Pat. No. 4,995,078, a television broadcast system is disclosed that allows a viewer to select a program to watch at a prescribed time. This system is limited in that it requires multiple viewers in multiple locations to view the program at the time it is broadcast, rather than allowing each viewer to independently choose his/her own viewing time. The Monslow system is limited because it is based on cable television technology using land lines and there are a limited number of channels to broadcast programming on, thereby severely limiting the number of different programs to be simultaneously watched by many viewers (i.e., the number of viewers who can watch a program solely of their own choice is bound by the number of available channels in the system). This system also does not provide VCR-type controls over the broadcast to the viewer.

Lambert, U.S. Pat. No. 4,381,522, discloses a selective viewing system whereby a viewer can control the content of a broadcast channel by telephoning a cable television company. The selected program is scheduled and broadcast at a scheduled time. The viewer monitors a directory channel to determine when the requested program is to be broadcast over the cable channel, and then watches the program at the scheduled time rather than at a viewer selected time. This system is also limited by the number of cable channels and does not provide VCR-type control to the viewer.

The above described systems only communicated analog video signals. McCalley, et. al., U.S. Pat. No. 4,829,372, discloses an interactive communication system for transmitting digital video data to viewers. However, this system is designed to transmit still frame television data over a cable network and does not provide VCR-type control over full motion video. Pocock, et. al., U.S. Pat. No. 5,014,125, also discloses an interactive television system for transmission of still frame images over a cable network. A telephone network is used to communicate viewer requests and video data between the viewer's site and a central location. Both the McCalley. et. al., and Pocock, et. al., systems are limited in that they do not support full motion video-on-demand.

Telephone lines have been proposed as an alternate means of video data distribution to alleviate the problems associated with a limited number of cable channels. Litteral, et. al., U.S. Pat. No. 5,247,347, describes a public switched telephone network used as a distribution network for digital video signals in a video-on-demand system. The distribution network is described in detail, but little disclosure is made of a mechanism for efficiently providing digital video data to the viewer via the network. In addition, the Litteral, et. al., system is limited because it is designed to work only with ISDN packets and existing telephone lines controlled by the telephone company central office switching equipment.

A complete digital video data transmission system is disclosed in Yurt, et. al., U.S. Pat. No. 5,253,275. The Yurt, et. al., system sends compressed digital video data on demand to viewers over standard telephone lines, cable lines, or satellite broadcast channels in less than real-time, for later playback or recording. The data is then decompressed for display on a television monitor. This system appears to solve some of the problems and limitations of systems described above, but it is limited in the numbers of viewers it can service by the bandwidth of its control computer. It does not address the problems relating to overall system throughput when providing service to more than a small number of viewers.

Another digital video data file server system is described in Mincer, et. al., U.S. Pat. No. 5,262,875. This system provides digital video data distribution, but, like Yurt, et. al., it does not address problems of system throughput when more than a trivial number of viewers are to be supported. The Mincer, et. al., system provides a file server for retrieving compressed, digital video data from a library of programs, and a plurality of playback units for decompressing and transmitting the video data to viewers. This system is designed to accept video data in less than real-time for storage in its library of programs, and subsequently transmit the data on demand in real-time to a viewer's playback station. The use of video data compression increases the amount of video data transmitted per unit time. The Mincer, et. al. system is deficient because the number of viewers it can service is bound by the transfer rate of the magnetic disk drive used to store the video data. The number of viewers simultaneously supported by this system appears to be as small as ten.

As described above, prior art systems do exist that provide a viewer VCR-type control over the delivery of digital video data. However, these systems are deficient in that they are severely limited in the number of viewers they can support. Retrieving many requests for full motion, digital video data from a mass storage device and forwarding the data to a distribution network for transmission to many viewers requires vast resources in terms of I/O access times, channel speeds, and overall system throughput. The bottleneck in successfully providing service to many viewers is not in the distribution network, but in the file server used to selectively access the digital video data, whether compressed or not. Accordingly, new techniques and system architectures are needed to effectively provide digital video-on-demand concurrently to many viewers.

SUMMARY OF THE INVENTION

An object of this invention is to provide a large number of viewers with the capability to selectively have access on demand to full motion digital video data from a central location for viewing on a display system located at each viewer's site.

Another object of the present invention is to provide a large number of viewers with the VCR-like controls of play, pause, rewind, forward, and stop, in controlling the retrieval and distribution of full motion digital video data on demand from a central location containing a video library to each viewer's site.

Still another object of this invention is allow many viewers to interactively select a program for viewing on a display system at each viewer's site and commence viewing of each program under each viewer's independent control.

Yet another object of this invention is to increase the number of viewers that may be simultaneously serviced by a digital video data server and associated distribution networks.

A further object of the present invention is to lower the cost of service per viewer for selective retrieval and distribution of digital video data on demand from a central location to a large number of remotely located viewers.

Still another object of this invention is to use the techniques of multi-casting and grouping of viewers into synchronization groups to increase the number of viewers being serviced by a digital video data server and associated distribution networks.

Yet another object of the present invention is to provide a digital video data server that distributes full motion digital video data to a large number of users over any one of several existing public or private large scale communications networks.

Still another object of this invention is to provide an improvement in the cost per viewer for sending digital video data over a network where multiple independent viewers are viewing the same digital video data.

Another object of this invention is to selectively distribute encoded, compressed, digital video data in real-time from a mass storage device connected to an enterprise server computer system by a high-speed Input/Output channel through a distribution network to a large number of remotely located viewer sites.

Yet another object of this invention is to utilize a high-performance enterprise server computer system and asynchronous transfer mode communications devices to selectively distribute encoded, compressed, digital video data in real-time over a public switched integrated-services network to a large number of remotely located viewer sites.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a multi-cast digital video data server capable of selectively retrieving encoded, compressed, digital video data from a video library on demand by a large number of viewers and distributing the video data through one or more distribution networks to a display system located at each viewer's site. The techniques of multi-casting and synchronization groups allow the video data server to increase the overall throughput for gaining access to the data retrieved from the video library, thereby increasing the number of viewers capable of being serviced by the system.

In the preferred embodiment, the role of the multi-cast digital video data server is best fulfilled by a large enterprise server computer system, preferably one with multiple processing units, high-performance internal system busses, a main memory of 1 to 16 gigabytes, many high-speed mass storage devices, and multiple high-speed I/O channels. The present invention uses the characteristics of such a large computer system to increase the number of viewers simultaneously supported and decrease the cost per viewer of video distribution service. Prior art systems are severely limited in the number of viewers supported because of the inadequate processing power of the processors and meager system throughput of the storage devices used in such systems. The present invention surpasses these prior art systems by fully utilizing the improved capabilities of large enterprise servers such as the 2200 Series computers available from Unisys Corporation to selectively distribute full-motion digital video data on demand to more viewers.

In accordance with an aspect of this invention, a system is provided for distributing selected real-time, encoded, compressed, digital video data on demand to one or more display systems for viewing by viewers, each viewer being resident at a different site. The system provides VCR-type control over the display of the video data to each viewer. It comprises a storage capability for storing the encoded, compressed, digital video data, the data being grouped into distinct programs, each program consisting of multiple frames, the storage mechanism allowing multiple, concurrent access to different frames within any given program. A high-speed server is provided to selectively retrieve frames of viewer-requested programs from the storage mechanism. One or more network interfaces is provided to accept the frames from the server, replicate the frames a selected number of times, one copy being for each viewer selecting the transmission of a particular program within a predetermined amount of time of other viewers, and to format the frames into transmission packets for distribution to the viewers.

In accordance with another aspect of the invention, a method is described for distributing selected real-time, encoded, compressed, digital video data on demand by a digital video data server to one or more display systems for viewing by viewers, each viewer being resident at a different site, and includes the step of providing a video library containing encoded, compressed, digital video data representing multiple programs, each program consisting of multiple frames of data. A request for service is received by the digital video data server from a viewer, a request being a command to play, pause, rewind, forward, or stop a selected program. The viewer is assigned to one of a set of synchronization groups when the viewer's request is play, each group consisting of zero or more other viewers who requested the distribution of the same program within a preceding predetermined amount of time of each other. The viewer is removed from the assigned synchronization group when the viewer's request is to pause or stop the viewing of the selected program. The viewer is reassigned to another synchronization group when the viewer's request is rewind or move forward the distribution of the frames of the selected program. The digital video data server continually retrieves in temporal order the frames of each selected program, starting with the beginning of each program. A copy of the current frames for the selected programs is sent in real-time to all viewers in each synchronization group. The process of responding to viewer requests for service and retrieval and distribution of frames is perpetual.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 6A and 6B are diagrams illustrating the concept of combining randomly arriving viewer requests into synchronization groups;

DESCRIPTION OF THE PREFERRED EMBODIMENT

The present invention provides a computer-based system to supply video "events" for end-user applications. An event is a stream of digital video data, possibly encoded and compressed, which is transferred by a Video Server from conventional magnetic disks, optical disks, magnetic tapes, or main memory to a viewer. An event can be thought of as a request for service from a Video Server and the associated data that is transferred as a result of the request. An event can provide service to only one viewers or many viewers. The number of viewers serviced by an event is dependent upon the class of service the event is associated with, such as Advanced Pay-Per-View (APPV), or Entertainment Video-On-Demand (EVOD). APPV service provides entertainment programming on multiple channels on a fee-per-view basis. A viewer requests distribution of a program for a fee. A program may consist of an entertainment program, music videos, distance learning, training exercises, etc. The service provider then transmits the program on a predetermined channel which can be received by the requesting viewer. A single event may serve many viewers for APPV. In contrast, EVOD supports individual, viewer-selected access to entertainment programming. EVOD offers viewers near-instant access to libraries of video materials by transferring video data directly to an individual viewer after the viewer requests service. EVOD service, however, requires multiple events to service multiple viewers. The present invention supports both APPV and EVOD events. Events used for different viewer requests may have different characteristics, and the number of events a given Video Server supports may vary depending upon the nature of the requests.

Figure 1:
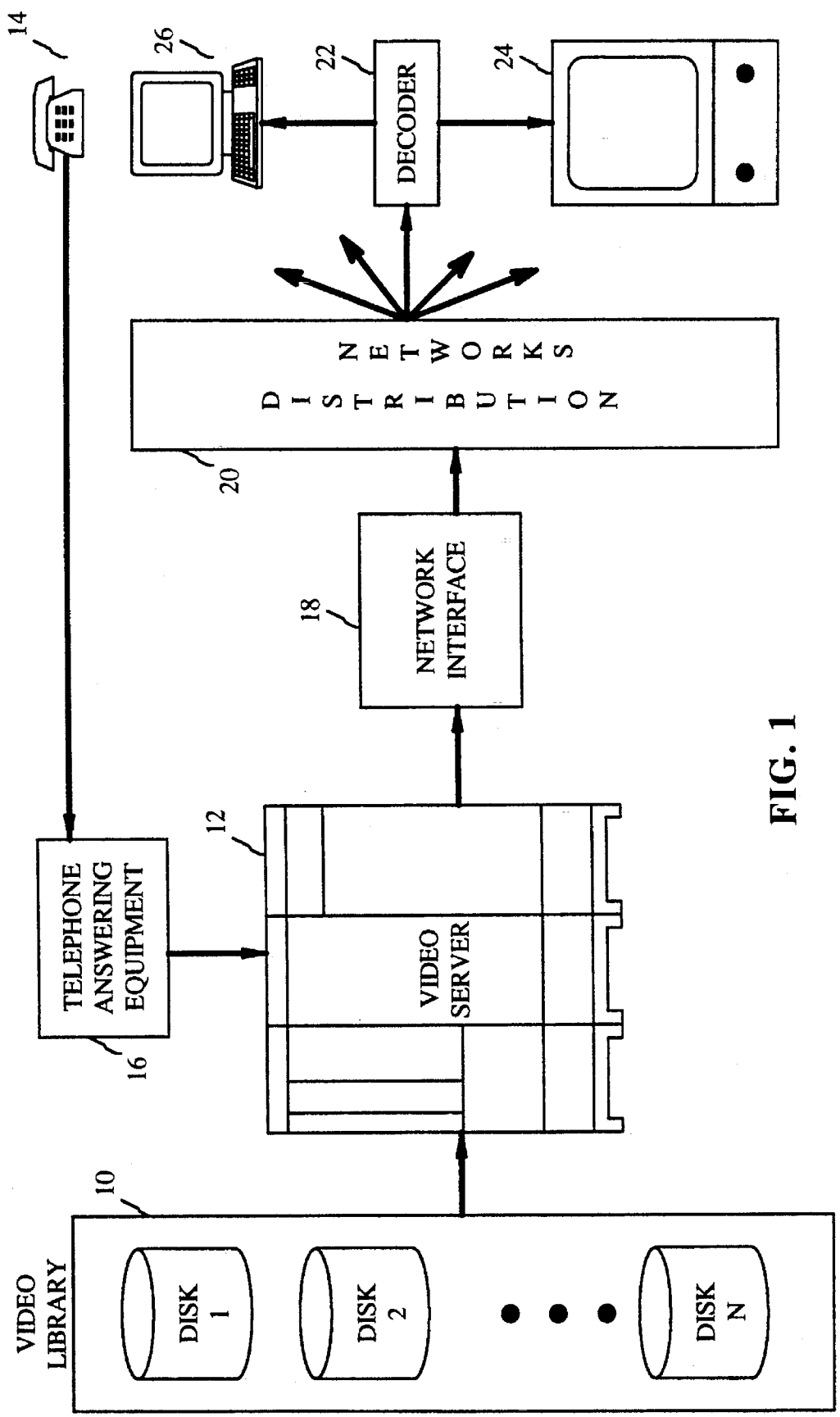
FIG. 1 is a diagram illustrating the Video Server system architecture of this invention.

FIG. 1 is a diagram illustrating the Video Server system architecture of this invention. A mass storage system, which can include a group of magnetic or optical disks making up a Video Library 10 constitutes the primary mass storage capability for digital video data in the system. The connection between the disks and the Video Server could be implemented as a FAST Small Computer System Interface-2 (SCSI-2) for fast access. The size of the overall database supported may be measured in multiple terabytes (TB) of video data. One implementation of a disk array to satisfy this requirement for mass storage may consist of up to 4000 disks, each containing 2 to 9 gigabytes (GB) of video data. As future advances in storage capabilities of disk technology arrive, the number of disks needed to support a given amount of video data will decrease. Alternatively, using higher capacity disks could increase the number of video data files available to the system users. Of course, the number of disks connected to the system may be limited to due to economic concerns and available I/O connections. If the Video Server is a 2200/900 enterprise server, the maximum number of I/O connections is 384. Encoded and compressed, full motion, digital video data is stored in files on the disks. Each file contains a video program. The digital video data is digitally encoded from an analog source such as a video camera, video cassette recorder (VCR), etc., and compressed to minimize storage requirements and transmission bandwidth. It should be understood that the term "video data" used herein also includes the accompanying audio signals associated with the video. Suitable video coding algorithms rely on Motion Compensated Prediction (MCP)

and Motion-Compensated Interpolation (MCI). These techniques are already known in the art. They provide compression of video information for playback using preprocessing and encoding of the video source data to produce a coded bit stream. The bit stream represents a sequence of data at 24 or 30 frames per second, where a frame is the amount of data shown on a display at a time. It should be understood that this 24 or 30 frames per second rate is a typical rate and is not meant to be a limitation on the present invention. A 120-minute program takes approximately 4 GB, or two disks, of storage. Other techniques such as the International Standards Organization (ISO) Moving Picture Experts Group (MPEG) I or II standards, the International Telegraph and Telephone Consultative Committee (CCITT) Px64 kbit/s video coding standard, or other standards (including future high-definition television (HDTV) standards) yet to be developed may also be used. Video coding standards are described in Aravind, et. al., "Image and Video Coding Standards", on pp. 67–89 of the January–February 1993 issue of the ATT Technical Journal, Vol. 72, No. 1. Although the preferred embodiment is intended to utilize compressed data in order to conserve bandwidth, it should be understood that the present invention is not limited to using compressed data. The system and techniques described below would still work with uncompressed digital video data stored in the Video Library, but the number of viewers and titles supported would decrease.

The Video Server 12 in the preferred embodiment is a 2200 Series Enterprise Server computer system available from Unisys Corporation. The Video Server is characterized by the need for rapid access to very large on-line databases, the capability to transfer data from mass storage sub-systems to high-speed communications links (i.e., superior I/O performance), high availability of system resources, and the capability of maintaining records such as usage statistics, billing information, and viewer preference profiles. The Video Server 12 is responsive to requests for service issued from a viewer's TOUCH-TONE telephone 14 and received via well known Telephone Answering Equipment 16. Alternatively, a viewer could communicate requests for service to the Video Server from a personal computer, computer terminal, or other devices via a modem. Special-purpose hardware could be used at the viewer's site to provide the viewer the capability to control the distribution service in a manner similar to a using a VCR remote control device. Video Library application software executing under the control of the operating system in the Video Server 12 coordinates the various requests for service from multiple viewers, retrieves appropriate video data from the Video Library 10 and forwards it to the Network Interface, and records viewer billing information. At a minimum, the Video Server must be capable of transferring 0.5 million bytes per sec (MB/s) over the Network Interface in order to provide quality video output. Further details of the Video Server's operation are described below.

The Network Interface 18 is a collection of hardware, firmware, and software modules (shown on FIG. 2) that facilitate the transfer of video data from the Video Server 12 to the Distribution Networks 20. The Network Interface transfers video data from the processing engine of the Video Server 12 into data packets recognizable by the Distribution Networks 20. In the preferred embodiment, the Network Interface connects to the Distribution Networks 20 via an Asynchronous Transfer Mode (ATM) Channel Adapter (CA). An ATM CA is a communications device that formats data into packets according to the well known ATM protocol.

The Distribution Networks 20 may be a Public Switched Telephone Network (PSTN) using Integrated-Services Digital Network (ISDN) communications technology (as described in Lehman, et. al., U.S. Pat. No. 4,763,317) implemented via coaxial cables, fiber optic links, and/or Asymmetric Digital Subscriber Line (ADSL) devices (as described in Litteral, et. al, U.S. Pat. No. 5,247,347). Alternatively, it may consist of private coaxial Community Antenna Television (CATV) cables similar to those used by a cable television company, or other well known networking architectures. The Distribution Networks 20 could also be based on the Fiber Distributed Data Interface (FDDI) II, an American National Standards Institute (ANSI) standard for a metropolitan-area network supporting isochronous traffic. The Distribution Networks 20 may also be some combination of the above named networks. In the preferred embodiment, the Distribution Networks include ATM devices.

Many viewers can receive data from the Distribution Networks 20. At each viewer site there is a display device and a Decoder 22. The Decoder 22 decodes and decompresses the digital video data received over the Distribution Networks 20 and sends it to a conventional Television Set 24 or a Computer Display 26. The Decoder 22 also decodes digitized audio data included in the compressed video signal and converts the digitized audio signal to an analog signal. For data sent to the Television Set 24, the Decoder 22 converts the digital video data it received to the analog National Television Standards Committee (NTSC), Phase Alternating Line (PAL), or other applicable video format. For data sent to the Computer Display 26, the Decoder 22 may de-interlace the data or convert the data to an applicable high-definition television format. Alternatively, the data could remain in MPEG-I, MPEG-II, or other digital video coding standard format. An example of a video coder/decoder device produced by the American Telephone and Telegraph (ATT) Company is described in Ackland, et. al., "A Video-Codec Chip Set for Multimedia Applications," at pp. 50–66 of the January–February 1993 issue of the ATT Technical Journal, Vol. 72, No. 1. Other decoders have also been produced by C-Cube Microsystems, Inc. and LSI Logic, Inc.

Figure 2:
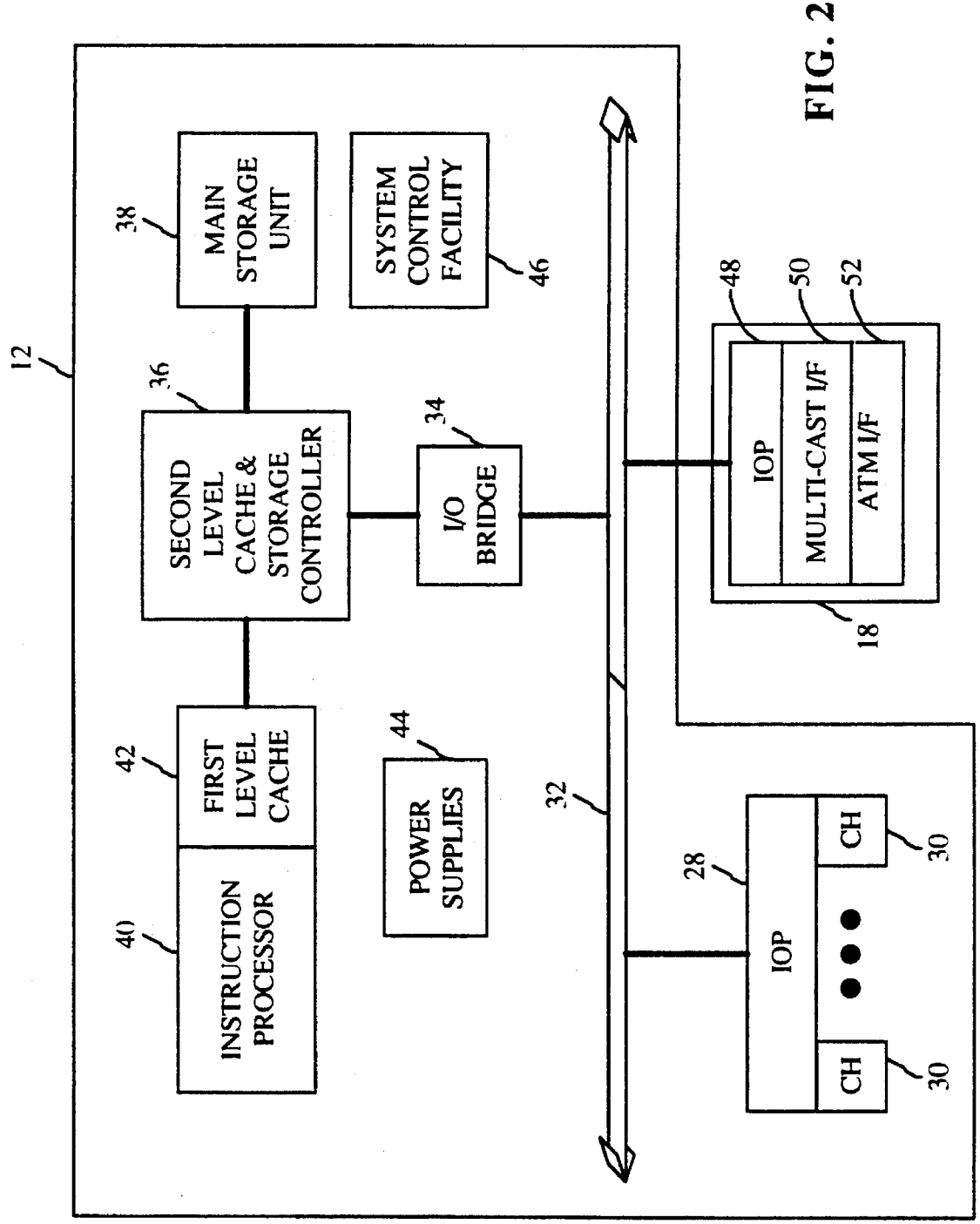
FIG. 2 is a block diagram of the Video Server and the Network Interface.

FIG. 2 is a block diagram of the Video Server and the Network Interface. In the preferred embodiment, the Video Server is composed of a 2200 Series computer system (available from Unisys Corporation), with one or more Instruction Processors (IPs), main memory plus expansions, I/O Processors (IOPs) with channel interfaces, and one or more system busses. Alternatively, the invention could be embodied in other high performance computer systems having multiple processing units and high speed storage devices. One or more systems may be combined according to the size of the video database and the number of simultaneous events required to be serviced. Digitized video data is stored on Disk 1 through Disk N 10 of FIG. 1. The video data is retrieved from the Disks by one or more IOPs 28 via I/O Channels (CH) 30 and an I/O Bus 32. Each IOP 28 connects to multiple I/O Channels 30. Although only one IOP is shown in FIG. 2, it is not intended that the maximum number of IOPs is one. Multiple IOPs may be used to access the system's mass storage devices.

The IOP 28 interfaces the Channels 30 through the I/O Bus to an I/O Bridge 34. The I/O Bridge is coupled to the Second Level Cache & Storage Controller 36, which accesses the Main Storage Unit 38. The Second Level Cache & Storage Controller 36 controls the transfer of video data from Disks 10 to the Main Storage Unit 38. The IOP 28 contains a software pointer to the specific memory locations (i.e., a buffer) in the Main Storage Unit 38 where the data is to reside. Each video event, or stream, is assigned its own set of memory buffers, typically three, for the temporary storage and synchronization of video data. The IOP 28 also contains information regarding the length of the transfer and several control "flags" which are used for internal control. Because of the relative speed differences between the IOP 28, the I/O Bus 32, and the Channels 30, one IOP may service multiple Channels, typically eight or sixteen Channels per IOP. Individual Channels 30 contain interface circuitry for each Channel and the connections necessary for Channel cables to the Disks 10 (not shown).

The number of Disks 10 attached to each Channel 30 is limited by the ability of the Channel to address the Disks, the electrical characteristics of the Channel, and the data utilization of the Channel. In the preferred embodiment, the addressing and electrical characteristics of the Channel provide a maximum of eight Disks per Channel. However, the data utilization of the Channel restricts the number of active Disks to a lower number, typically four.

Given these restrictions, the greater the number of Channels that can be supported on a given system, the greater the number of video events or streams which can be supported on that system. Additionally, disk storage of video data provides the best trade-off between cost, amount of storage, and data access time. Disks provide storage at between 1/10 and 1/15 the cost of similar amounts of system (or main) memory. The advantages of a faster access from system (or main) memory, on the order of a thousand times faster than magnetic disk access, are not utilized in a video data application where data may not be accessed for long periods of time. It should be understood that a "loading" copy of the video data exists on the magnetic disks. However, large amounts of video data could be loaded into system memory and then distributed to viewers for applications where fast access is critical.

Instruction Processor 40 executes the computer program used to control the retrieval and forwarding of video data. First Level Cache 42 provides for the acceleration of data and instruction fetches for the Instruction Processor 40. Although only Instruction Processor and First Level Cache are shown, in the preferred embodiment, two Instruction Processors and associated First Level Caches could be configured. The Main Storage Unit 38 is used for the intermediate storage of video data received over the I/O Bus 32, as well as for storage of the operating system and application programs. The Instruction Processor 40 directs the retrieval of the video data from the Disks 10 according to viewer requests. Power Supplies 44 are provided to supply electrical power to the system. The System Control Facility (SCF) 46 is a maintenance and system control unit for initializing the system and the reporting of fault conditions.

The video data fetched from the Disks 10 is stored in the Main Storage Unit 38 temporarily before being forwarded to one of the Network Interfaces 18, for subsequent distribution of the Distribution Networks 20. Each Network Interface 18 consists of three components. The I/O Processor (IOP) 48 contains a software pointer to the specific memory locations where the video data resides. The IOP also contains information regarding the length of the transfer and several control flags which are used for internal control. For each event, the IOP obtains the video data from the Main Storage Unit 38 through the Second Level Cache & Storage Controller 36 and I/O Bridge 34 under control of the pointers and control flags stored internally. The Multi-Cast interface (Multi-Cast I/F) 50 supports the multi-cast of video data streams to the Distribution Networks 20. It replicates an event as needed. The ATM Interface (ATM I/F) 52 formats each video data stream portion received from the Multi-Cast I/F 50 into packets for transmission by the Distribution Networks 20 to the end-users.

The components shown in FIG. 2 as the Video Server 12 comprise one specific configuration of a 2200 Series computer system. Alternatively, another Second Level Cache & Storage Controller 36, Main Storage Unit 38, I/O Bridge 34, I/O Bus 32, additional Instruction Processors and First Level Caches, and Power Supplies 44 could be provided. For such a system, more IOPs 28 and Network Interfaces 18 could be supported.

Techniques which allow concurrent access to a disk copy of the video data to support multiple events provide for increased system throughput. To match unequal data rates between disk access and network delivery, all data are staged through the Main Storage Unit 38 of the Video Server in a multiple buffer scheme illustrated below in FIG. 7. This allows larger blocks of data to be read from disk, which permits efficient utilization of disks and disk channels. Methods to "multi-cast" common video data streams to multiple viewers, while still permitting independent control by the viewers, reduce the cost-per-event price of these systems. Multi-casting of video data allows Video Servers based on an enterprise server architecture to support more viewers than would otherwise be possible.

Application support functions, such as database control and administration, customer billing, viewing statistics, and viewer preference profiles may be done on the same computer system which provides overall control of the video server process in small systems. In larger systems, a controller computer system executing in an On-Line Transaction Processing (OLTP) mode may control several Video Servers to increase the number of simultaneous viewers supported.

Figure 3:
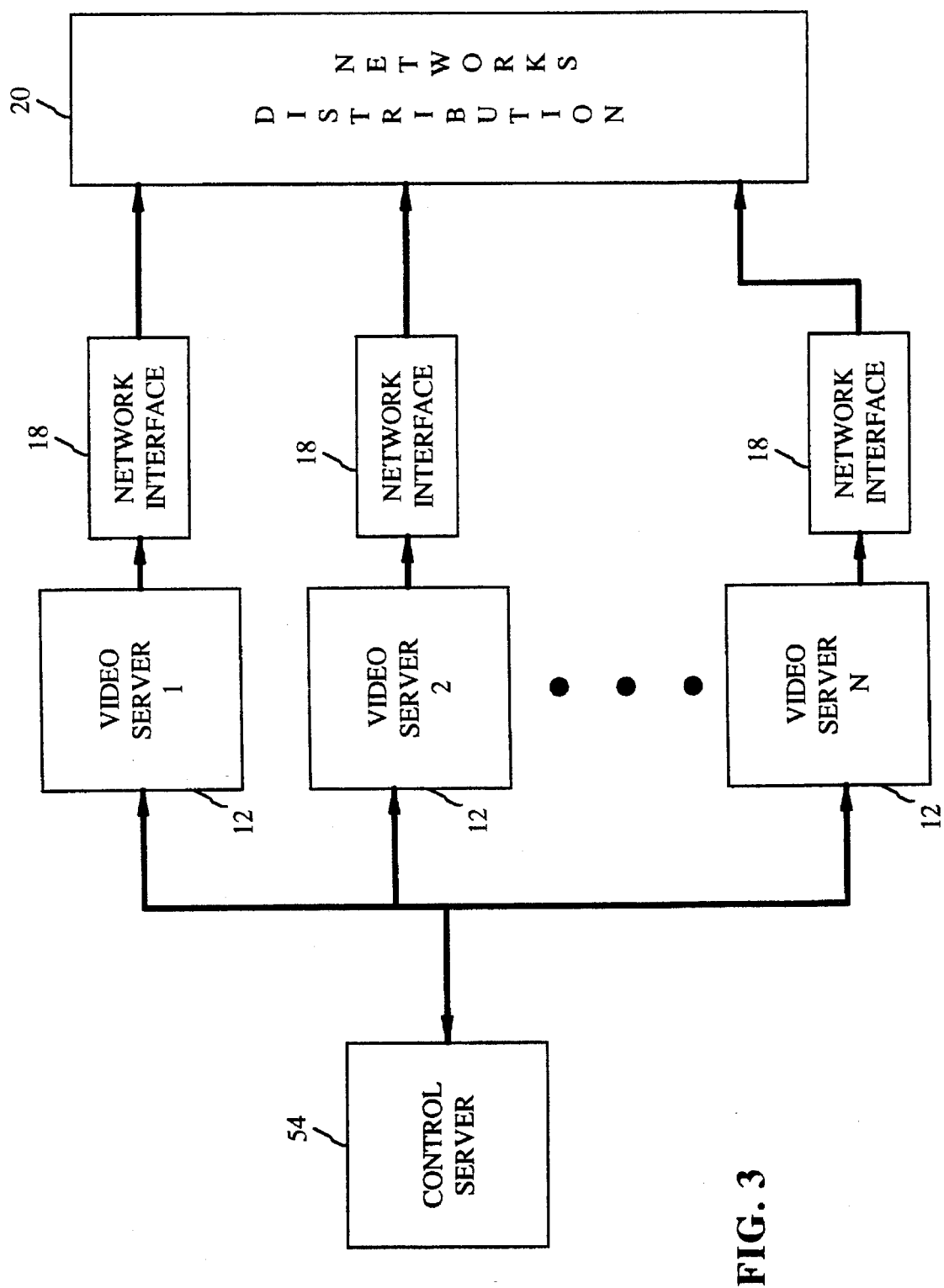
FIG. 3 is a diagram showing multiple Video Servers connected to a Control Server.

FIG. 3 is a diagram showing multiple Video Servers connected to a Control Server. To increase the overall system throughput, thereby increasing the number of viewers and events supported, multiple Video Servers 12 are coupled together in a network configuration. Each Video Server 12 forwards video data to an viewer via its Network Interface 18 and the Distribution Networks 20. Each Video Server 12 could have its own set of mass storage devices (not shown) to store portions of the system's Video Library. Alternatively, a common set of mass storage devices (not shown) could store the Video Library and all Video Servers could access the Video Library as needed. In addition, a Control Server 54 executes an application program to provide for load balancing between the Video Servers via selective distribution of service requests, and a higher level of value-added control services. By using a Control Server 54, each Video Server 12 is capable of supporting the maximum number of events, without having to expend processing time on administrative overhead. Instead, the Control Server 54 may receive viewer service requests from Telephone Answering Equipment (not shown), coordinate the access of the multiple Video Servers to the Video Library (not shown), and accumulates billing information. Alternatively, viewer requests could be received by any Video Server 12 over a "back channel" in Distribution Networks 20 and Network Interfaces 18.

Figure 4:
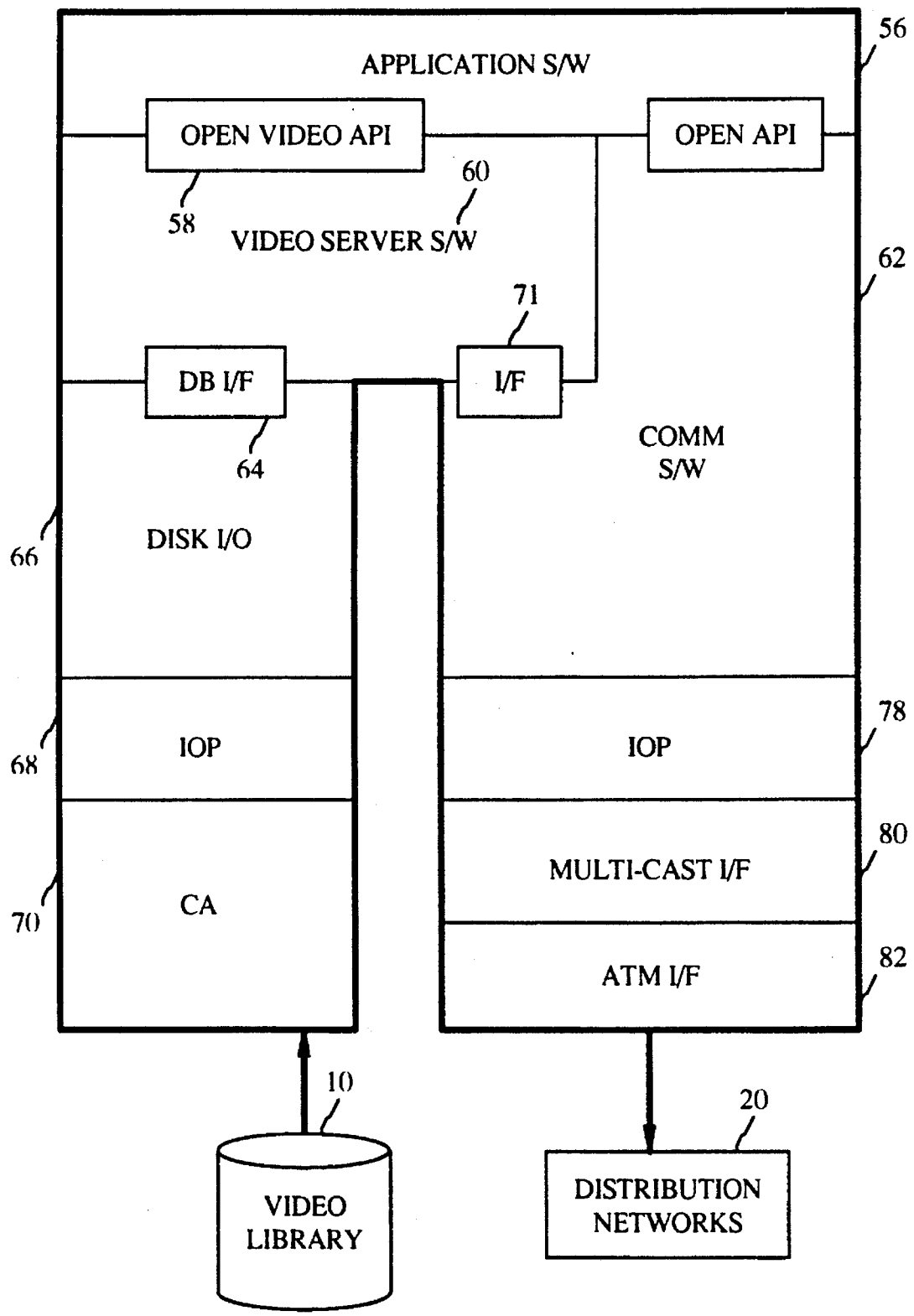
FIG. 4 is a functional block diagram of the software and hardware components executing in the Video Server and Network Interface.

FIG. 4 is a functional block diagram of the software and hardware components executing in the Video Server and Network Interface. Application Software (S/W) 56, receives viewer service requests, schedules retrieval of video data from disk, and controls system resources. The Application SW activates an Open Video Application Programming Interface (API) in order to easily utilize Video Server Software (S/W) 60. "Open" in this context means non-proprietary; the interface utilizes an industry standard. The Application S/W 56 also activates open APIs to interface with internal Communications Software (COMM S/W) 62. This interface is used for normal communications between the Application S/W and COMM S/W processes. The Video Server S/W 60 provides the Video APIs and bit streamer for video data. This software translates Application-generated Open Video API requests into Video Library service requests, loads the appropriate data, and controls the data delivery to the Distribution Networks 20 via Communications S/W 62. This software provides standardized interfaces to Applications (ex. PLAY (user_destination, title, starting_point)). The Video Server S/W 60 uses Database Interface (DB I/F) 64 to instruct Disk I/O software 66 to obtain the requested video data. Disk I/O routines 66 send commands through the IOP hardware 68 and Channel Adaptor (CA) hardware 70 to retrieve the video data from the Video Library 10.

The Video Server S/W 60 formats outgoing communications requests containing the retrieved video data to Communications S/W 62 via low-level video data Interface (I/F) 71 (also known as a "bit streamer"). Communications S/W 62 buffers video data before tranferring the data to IOP 78. The IOP 78 forwards the data to the Multi-Cast I/F firmware 80. The Multi-Cast I/F firmware replicates the video data by passing each block of video data multiple times to the ATM I/F 82, depending on the control parameters of the event currently being processed. The Multi-Cast I/F functionality could also be implemented in software or hardware. Each copy of the video data is sent to a different destination. ATM I/F software 82 formats the video data into transmission packets and sends them through the Distribution Networks 20 to the requesting viewers.

The 2200 Series-based Video Server configuration shown in FIG. 2 supports two general models of operation—a disk-based model or a memory-based model. The disk-based model contains video data stored on multiple disk drives. Multiple programs are maintained, as are multiple copies of each title. A program in this context may be a film, program, sporting event, training exercise, etc. Individual viewer requests to play a program are satisfied by reading the appropriate video data in large blocks from disk to a buffer in main memory, and then transmitting the video data in smaller, frame-sized blocks to the viewer's display system in real-time. Multiple viewers may access different areas of the same program stored on the same disk drive concurrently. Depending on the storage capacity of the disk drives used, and the length of the titles, more or less than one disk drive may be required to store all of the data required for a single program. A disk-based Video Server supports a larger number of programs from a single system with a smaller number of discrete events than does the memory-based configuration.

Memory-based Video Server models contain video data in main memory. The memory is loaded with video data prior to the start of service from a disk or tape media in non-real time. The amount of video data that can be stored is, of course, proportional to the main memory available. Individual play requests are satisfied by transmitting the data in small, frame-sized blocks to viewers as required. A memory-based Video Server supports many viewers of a relatively small amount of data. To support more titles, more systems must be networked together as shown in FIG. 3. For general use, the memory-based model may be inadequate. The trade-off between these two approaches is the number of titles supported versus the number of active users per title. The memory-based system supports more viewers, but fewer titles are supported at a time. Conversely, the disk-based system supports more titles but fewer viewers.

In order to provide independent control of the presentation of video data to the viewer in an environment where many viewers can view the same program, each viewer must be given a separate stream of data from a common source. The viewer may then start, stop, pause, or rewind the video data stream that they requested. These actions do not affect the data being delivered to other viewers. Commands to the Video Server SW 60 from the Application 56 include starting delivery of a video data stream, terminating delivery of a video data stream, pausing delivery of a video data stream, and rewinding or resetting a video data stream. The implementation of these viewer requests controls the retrieval and subsequent transmission of the data being read from the Video Library 10 by the Disk I/O 64, IOP 68, and CA 70. In the preferred embodiment, these requests are input to the Video Server through the viewer's telephone and Telephone Answering Equipment as shown in FIG. 1. Alternatively, other methods of viewer interaction with the Video Server could be employed to forward viewer requests. For example, viewer requests could be input to the Video Server via a side channel.

Regardless of the basic configuration used, the cost per event of a full service Video Server system may be significantly reduced through the use of multiplexed disk access with large block reads, multi-casting, and synchronization groups.

A limiting factor of a disk-based Video Server system is the throughput of the disks where the video data is stored and their associated I/O channels. The I/O Channel 30 to Main Storage Unit 38 interface (as shown on FIG. 2) is the main bottleneck in the Video Server system if there is more than one video data communications stream per disk read (i.e., either multi-cast EVOD or APPV). However, by using high performance disks, channels, memory buffers, and large block reads, multiple individual viewers may be served from a single copy of video data stored on a disk. If a large enterprise server such as the 2200/900 computer system is used as the Video Server, then many I/O channels are available for transferring video data from the mass storage devices to the distribution networks, thereby increasing overall system throughput. Concurrent access to the disk is achieved by multiplexing; multiple viewers can be requesting digital video data from titles stored on the same disk. This technique allows the number of disks required for video data storage to be significantly reduced. Temporary storage buffers are established in main memory, sized to contain some amount (e.g., one or more seconds) of video data at the desired display rate. Each viewer receives a minimum of two buffers, although more may be used to further improve disk throughput. These buffers allow the disks and associated channel to be used to transfer data for a larger percentage of the time as compared to seek and rotational latency time. A typical disk transfer of 512 bytes requires about 17 milliseconds. Most of this time is for access and latency. Thus, a large percentage of time for each data read is not being used for actual data transfer. Quality video requires a minimum of 0.5 megabytes (MB) per second of data to be transferred. If this amount of data (i.e., one second's worth) was fetched from disk, the time to retrieve the data on a conventional magnetic disk would be approximately 28 milliseconds (ms). The data is buffered in main memory and subsequently transferred through the Network Interface at a different pace than it was fetched from disk. Data is transferred at 10–30 KB per video frame at a rate of 30 frames per second. While data is being transmitted to the user from a first buffer, a second buffer (or other buffer) is loaded with data read from the disk. When all data contained in the first buffer has been transmitted over the Network Interface, the buffers are swapped and the process continues.

Recent advances in magnetic disk technology may improve system throughput and enhance the value of large block reads. For example, the 2.1 GB capacity Barracuda ST12550, available from Seagate Technology, Inc., is capable of transferring data at a sustained rate of up to 7.0 MB/sec with only a 8.0 millisecond seek time. Such improvements in disk technology can help the Video Server provide service to an even larger number of viewers.

This approach using a multiplexed disk and large block disk reads makes maximum use of the peak speed of the disk and I/O channel. The seek and rotational latency time becomes less of a limiting factor for the Video Server to support larger numbers of events. The number of concurrent events supported per disk without this buffering technique is one. With this technique, the concurrent number of events supported per disk rises to approximately four to eight.

The technique of combining the concepts of multi-casting and synchronization groups takes advantage of two sets of probabilities. First, when a relatively large number of viewers access a relatively small portion of a database, some number of viewers will be accessing the same general portion of the database at the same time. Secondly, many viewers will be accessing the overall database at roughly the same time of day. For example, the cable television industry estimates that it will derive up to 80% of its revenue from premium entertainment programming consisting of the ten most popular titles. In addition, general work and living patterns of most viewers dictate that the highest demand for service comes between 7 pm and 11 pm.

The use of the technique of synchronization groups allows the re-use of video data through the multi-casting of separate events working on the same general area of a video database. Video data streams for events which are close to each other in time are adjusted to use the same data at the same time. This technique allows data from a single disk I/O operation to be sent to multiple viewers concurrently, thereby reducing the number of disk accesses required to service the same number of users of that program. This technique combines the benefits of multiple viewer efficiency of APPV with the individual control of EVOD. Furthermore, since the mechanism to perform multi-cast transmission is part of the I/O subsystem called the Network Interface 18, the data band-pass of the Video Server 12 is used to support more events. Depending on the level of concurrency obtained, multi-casting may improve the cost per event by a factor of up to 30 times. The upper limit is a function of the bandpass of the communications interface (i.e., the ATM connection).

In the preferred embodiment, multiple streams of the video data for each program are started at slightly different times and allowed to play to completion, repeating the entire stream as required. For example, the video data stream for a 120 minute program might be started once each minute, providing 120 different streams. Each video data stream originates from a copy of video data on disk, and is identical in content to all other streams of that program. Each video data stream is repeated when it is completed, unless there are no viewers in a position to require display of that stream. The time between starts may also be changed. This time could be increased to five minutes or ten minutes, or decreased to 30 seconds or 10 seconds, depending on the capabilities of the system, the number of titles supported, the number of viewers to be serviced, and the demand for a given title. The time between starts may also be dictated by the acceptable delay time for the viewer between a request for service and delivery of video data.

Figure 5:
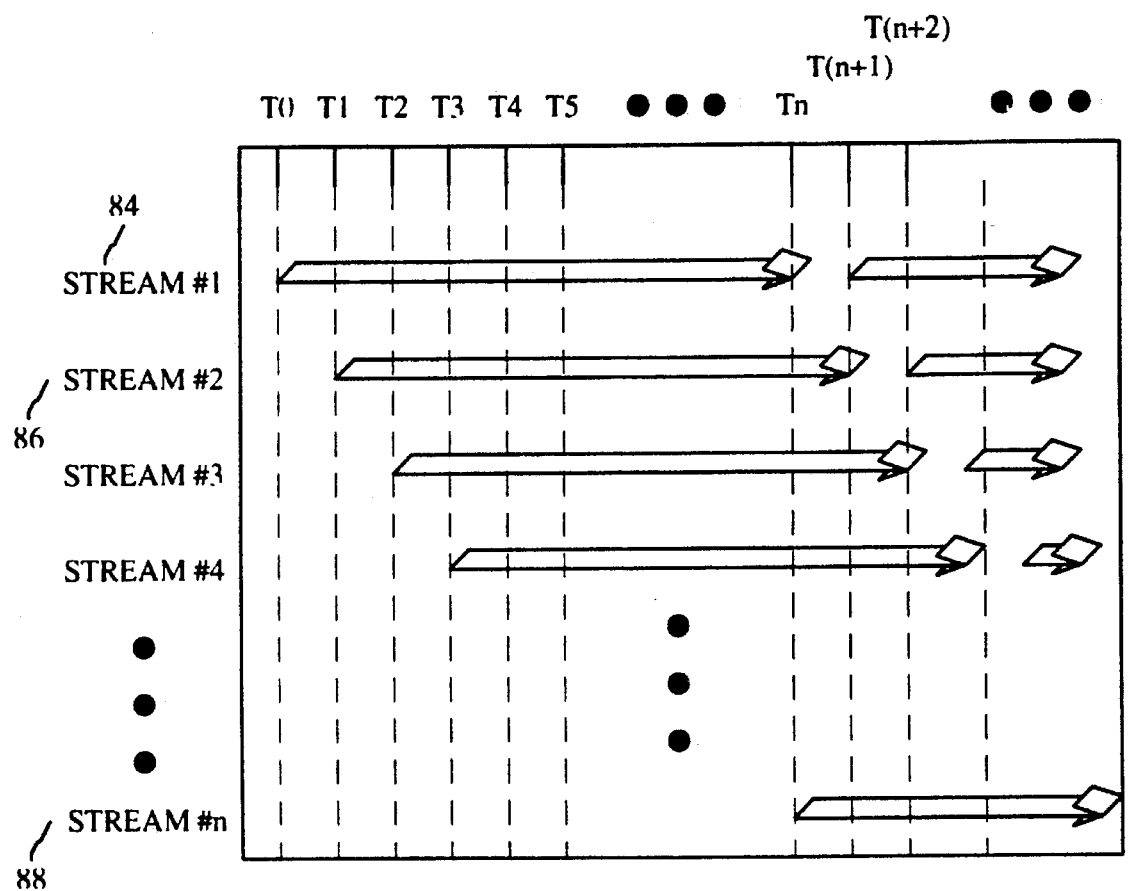
FIG. 5 illustrates the concept of multiple video data streams.

FIG. 5 illustrates the concept of multiple video data streams. In this example, the time period between streams is one minute. This time between starts is for illustrative purposes only and is not to be considered limiting of the scope of the present invention. Each stream is n minutes long. Thus, Stream #1 84 starts at time T0 and ends at time Tn. Stream #2 86 starts at time T1 and ends at time T(n+1). The other streams are processed in a like manner, up through Stream #n 88 as shown. Of course, the number of independent streams is dependent on the selected time period between streams. Control over the starting, stopping, and distribution of video data streams is provided by Video Server SW 60 shown on FIG. 4.

Figures 6A, 6B:
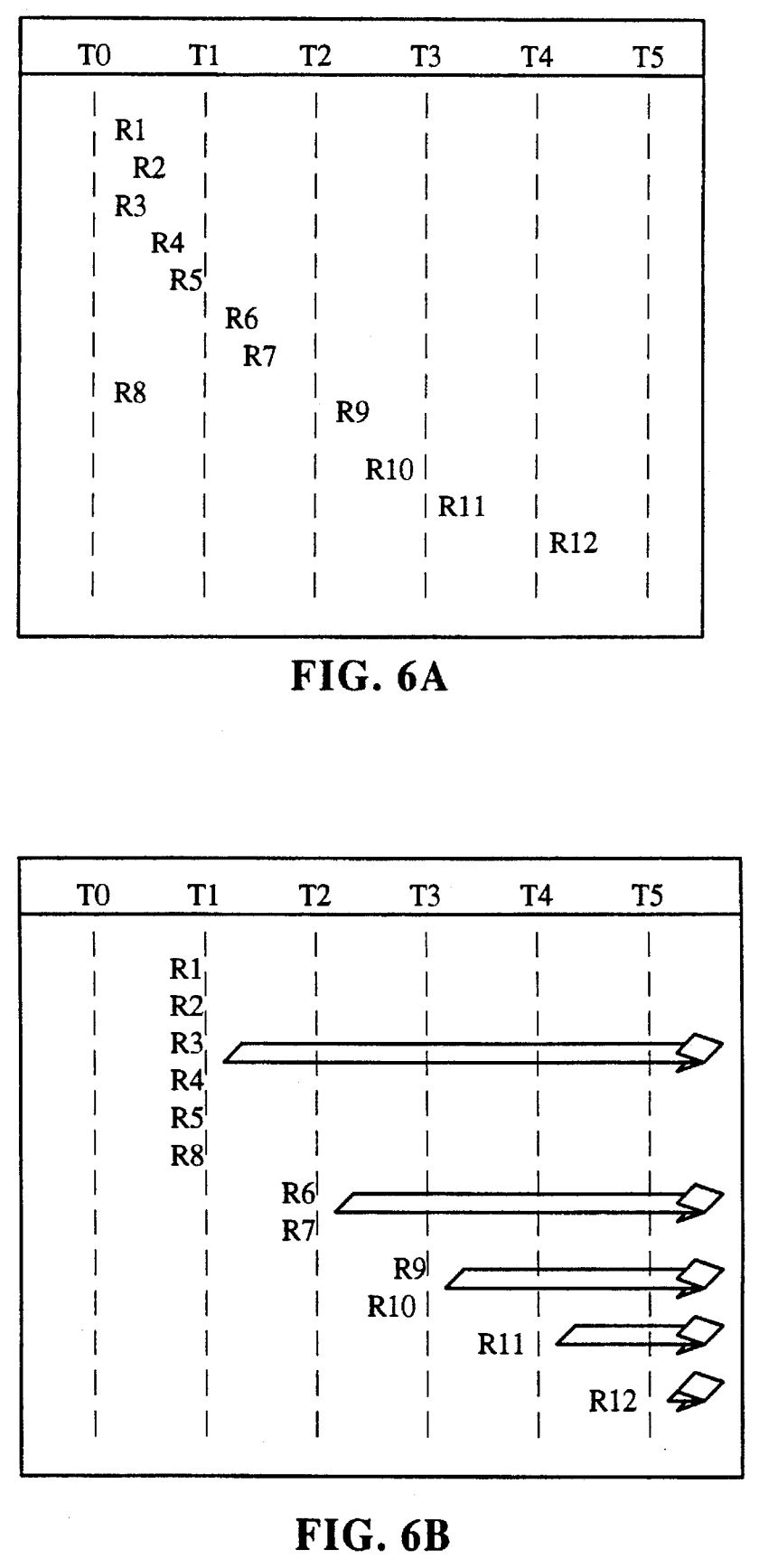

As viewer requests to commence service for a particular title are received by the Video Server 12, responsive service is delayed until the next "synchronization point", i.e., the start of the next video data stream for the requested program. Viewers synchronized to a given video data stream, or point within a stream, are considered to be grouped. Note that multiple groups may exist for any given synchronization point within a series of streams. FIG. 6A and FIG. 6B are diagrams illustrating the concept of combining randomly arriving viewer requests into synchronization groups. Requests for service are received from viewers at random. These requests are shown as R1, R2, . . . R12, for this example. In FIG. 6A, requests R1, R2, R3, R4, R5, and R8 are all received by the Video Server after time T0, but before time T1. These requests are grouped into a synchronization group starting transmission at time T1 as shown in FIG. 6B. Similarly, requests R6 and R7 are grouped into the synchronization group starting transmission at time T2, and so on.

Quasi-independent control by the viewer of the display of individual video data streams is provided by "slipping" the viewer from one video data stream to the next according to the viewer's requests. For example, if the viewer requests to PAUSE or STOP the transmission of the current stream, the viewer is removed from the synchronization group to which he/she is currently assigned. The Video Server SW 60 keeps track of which synchronization group the viewer has left and at what point in the stream service was interrupted, in order to allow the viewer to restart the transmission of a video data stream in the future from the termination point. To continue transmission after a PAUSE, a PLAY request from the viewer causes the viewer's new video data stream transmission to be resynchronized with whichever video data stream represents the point at which the PAUSE or the STOP request was received (i.e, the termination point). Due to the time granularity of the synchronization groups, some data may be retransmitted to the viewer; the potential overlap would be the unit of time between video data stream transmissions. A timeout feature could be applied to a viewer's PAUSE request, converting the PAUSE to a STOP request if after some predetermined period of time has elapsed since the viewer's PAUSE request and PLAY request has not been received for that viewer. Referring back to FIG. 5, if a viewer was currently synchronized to Stream #2 86, for example, and at time T4 issued a PAUSE request, the viewer would be removed by the Video Server SW 60 from the synchronization group for Stream #2. If at time TN the viewer issued a PLAY request to continue the display of the selected program, the viewer would be added to the synchronization group for the video data stream which started at time T(n–3). Since Stream #2 started at time T1, and the viewer paused at time T4, a difference of three time units, the video data stream required to be transmitted to the viewer to deliver the correct data must be the stream which started three time units before the selected restart time Tn. Implementation of the REWIND and FORWARD requests also result in a change in the assigned synchronization group for the requesting viewer.

The synchronization of viewer requests into groups allows a single copy of video data to be read from the Video Library 10 and sent to all members of a group, thus conserving disk channel and I/O bandpass. Synchronization groups are effective in increasing Video Server system throughput only if the replication of the video data stream is performed at a point beyond the system I/O facility to the Video Library, such as in the Network Interface. By transferring a single copy of the data to the Network Interface, and requiring it to send a copy to each viewer in a particular synchronization group, a significant reduction in utilization of Video Server I/O bandpass is achieved.

Figure 7:
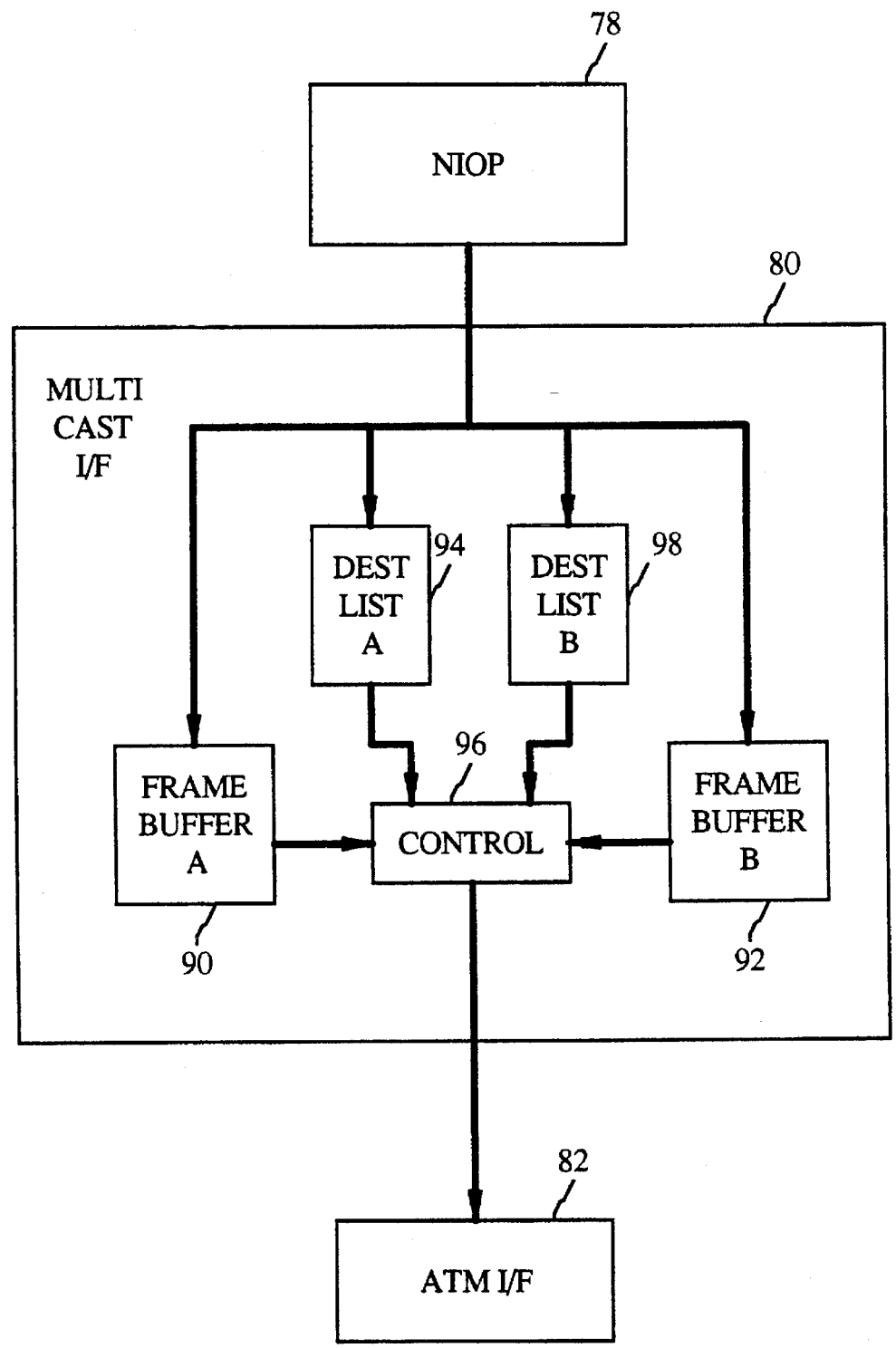
FIG. 7 shows a block diagram of the Multi-Cast Interface.

This multi-cast capability with synchronization groups may be implemented by a multiple buffering scheme. FIG. 7 shows a block diagram of the Multi-Cast Interface. The NIOP 78 sends a block of video data for a particular video data stream and a list of network destination identifiers (IDs) for the viewers in a synchronization group. The Multi-Cast I/F 80 allots at least two Frame Buffers 90, 92 for storage of transient video data. Frame Buffer A 90 is loaded with the block of video data. The corresponding Destination List A 94 is loaded with the network destination IDs of the viewers in the current synchronization group being serviced. When the video data is required to be sent to the group members, the data transfer is initiated. Control logic 96 passes the first network destination ID from the Destination List A 94 and the video data from the Frame Buffer A 90 to the ATM I/F 82. When the Frame Buffer has been transmitted to the first viewer, the next network destination ID in Destination List A 94 is selected and passed to the ATM I/F 82, along with the contents of the Frame Buffer A 90. This process is repeated for each destination in Destination List A, thereby replicating the video data stream.

While the active Frame Buffer's data is being sent to the destinations in Destination List A, the other, empty Frame Buffer B 92 and its corresponding Destination List B 98 are loaded with video data and network destination IDs for the next time period in the current video data stream.

Figure 8:
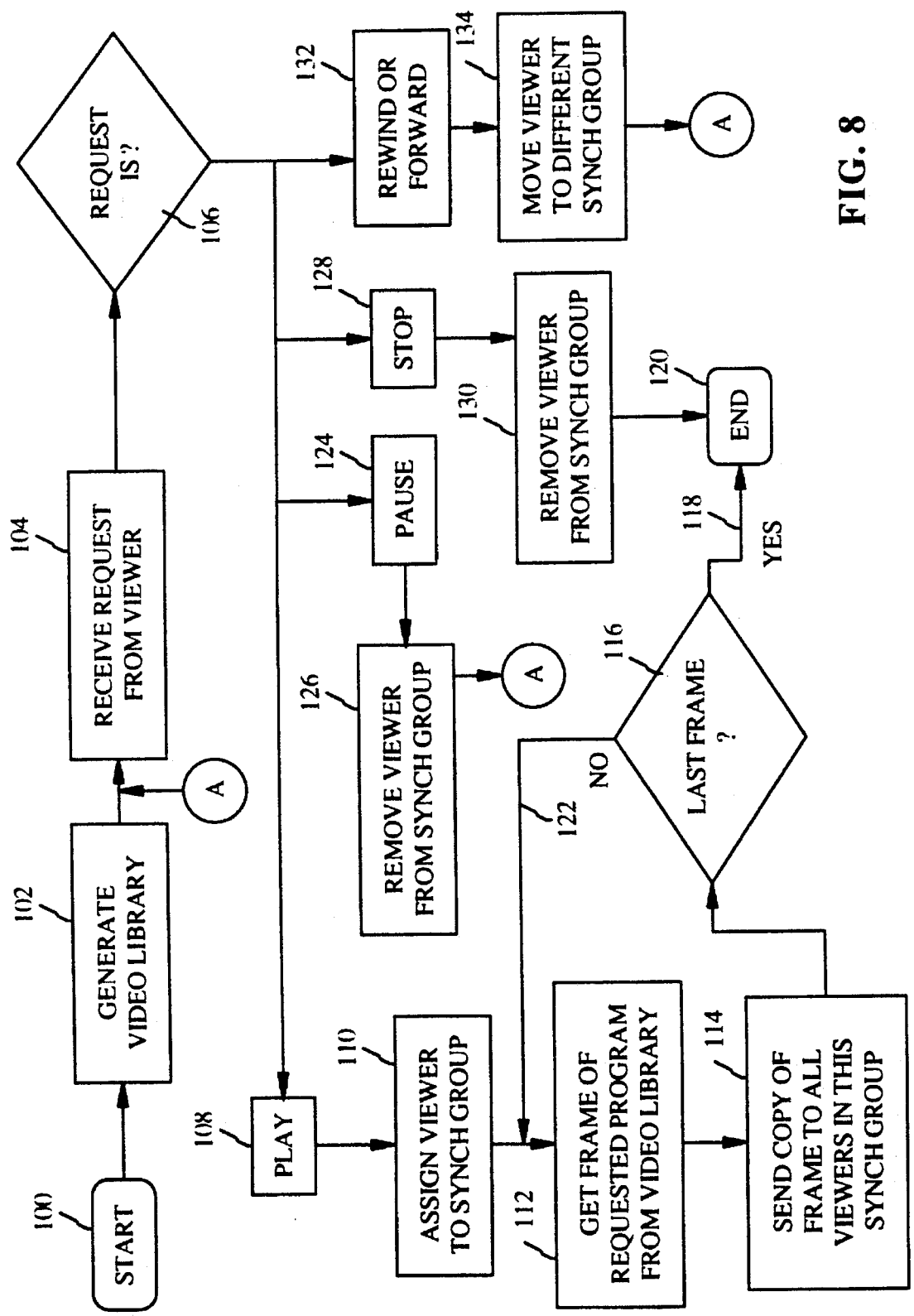
FIG. 8 is a flow diagram showing how viewer requests relate to synchronization groups.

FIG. 8 is a flow diagram showing how viewer requests relate to synchronization groups. Processing begins at the Start Step 100. The Video Library 10 is generated at Step 102. A viewer request for service is received at Step 104. Test Step 106 determines what type of request has been made by the viewer. If the request is to initiate service (i.e., PLAY a program), PLAY processing 108 is performed. The viewer is assigned to a synchronization group corresponding to the requested program and the next start time for that program at Step 110. A frame for the requested program is obtained from the Video Library at the start time for the synchronization group at Step 112. A copy of the frame is sent to all viewers in this synchronization group at Step 114. If this frame is the last frame (Test 116), then Yes path 118 is taken and processing ends at End 120 for this viewer. If it is not the last frame, then No path 122 is taken to get the next frame of the requested program.

If the viewer's request was to PAUSE 124, then Step 126 is performed to remove the viewer from the assigned synchronization group. Processing for this viewer will continue only when a new request for service is received. If the viewer's request was to STOP 128, then Step 130 is performed to remove the viewer from the assigned synchronization group. Processing ends for this viewer at End 120. If the viewer's request was to REWIND or FORWARD 132, then Step 134 is performed to move the viewer to a different synchronization group. Processing continues for this viewer with the reception of a new viewer request.

A Video Server system and related system throughput improvement techniques have been described. The multiplexed use of a single source of digital video data for multiple viewers significantly reduces the number of mass storage devices required, while maintaining independent control of the data presentation by the user. Synchronization of randomly arriving viewer service requests into groups which may be supplied with a single copy of video data requires less system bandpass for a given number of viewers, also while maintaining independent control. The temporal distance between synchronization groups can be changed to adjust overall Video Server system performance. Multi-casting digital video data provides for an increase in the number of video data streams which can be provided from a Video Server. The combination of these techniques promises to reduce the cost of delivering an event to an end-user by a factor of eight to 30 times.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A system for selectively distributing selected programs on demand to one or more display systems for viewing by viewers, the system providing to each viewer interactive control over the display of the programs on a display system, comprising:

storage means for storing the programs, the programs being distinct, individually selectable programs, said programs being divided into multiple frames of data signals, and for providing multiple, concurrent accesses to said programs;

server means coupled to said storage means for retrieving from said storage means selected frames of selected ones of said programs;

network interface means coupled to said server means for accepting said selected frames from said server means, for forming a selected number of replicated frames from said accepted frames, and for formatting each one of said replicated frames into a transmission packet, each said transmission packet being identified for a selected display system;

distribution network means coupled to said network interface means for accepting said transmission packets from said network interface means and for distributing said transmission packets to at least one selected display system;

decoder means coupled to said distribution network means and to at least one selected display system for extracting said replicated frames from said transmission packets, and for presenting said replicated frames for real-time display on at least one selected display system; and viewer selection means coupled to said server means for interactively communicating viewer requests for digital video data distribution service to said server means.

2. A system having a plurality of display systems capable of selecting programs as in claim 1, further including a plurality of network interface means coupled to said server means and said distribution network means, each of said plurality of network interface means for accepting said selected frames from said server means, for forming a selected number of replicated frames from said accepted frames, and for formatting each one of said replicated frames into a transmission packet, each said transmission packet being identified for an associated one of the plurality of display systems.

3. A system as in claim 1, further including a plurality of server means coupled to said storage means for retrieving from said storage means said selected frames of selected ones of said programs interactively selected by viewers, a plurality of network interface means, at least one of said network interface means being coupled to each one of said plurality of server weans for accepting said selected frames from said coupled server means, for forming a selected number of replicated frames from said accepted frames, and for formatting each one of said replicated frames into a transmission packet, each said transmission packet being identified for of the display systems, and a plurality of viewer selection means, at least one of said viewer selection means being coupled to each one of said server means for interactively communicating viewer requests for digital video data distribution service.

4. A system as in claim 3, further including control means coupled to said plurality of server means for redistributing viewer requests for digital video data distribution service to a selected one of said server means.

5. A system as in claim 4, wherein said control means includes means for generating viewer billing information.

6. A system as in claim 1, whereby said server means is capable of processing viewer requests in real-time to start, pause, and stop digital video data distribution service, and to modify each requesting viewer's temporal position in said programs.

7. A system as in claim 2, and further including a plurality of decoder means coupled to said distribution network means, each one of said decoder means being coupled to a different one of the display systems, for extracting said replicated frames from said transmission packets and for presenting said replicated frames for real-time display on each viewer's display system.

8. A system as in claim 1, wherein said digital video data signals the programs stored in said storage mean are encoded and compressed digital video data signals.

9. A system as in claim 8, wherein said decoder means includes means for decoding and decompressing said replicated frames prior to display on a display system.

10. A system as in claim 1, wherein said viewer selection means are automated telephone answering devices, coupled to said server means and to a telephone at each viewer's site via a public switched telephone network, for interactively communicating viewer requests for digital video data distribution service to said server means.

11. A system as in claim 1, wherein said storage means comprises an optical disk drive.

12. A system as in claim 11, wherein said storage means further includes a plurality of optical disk drives.

13. A system as in claim 1, wherein said storage means comprises a magnetic disk drive.

14. A system as in claim 13, wherein said storage means further includes a plurality of magnetic disk drives.

15. A system as in claim 1, wherein said storage means comprises a random access semiconductor memory.

16. A system as in claim 15, wherein said storage means further includes a plurality of random access semiconductor memories.

17. A system as in claim 1, wherein said storage means comprises a magnetic tape drive.

18. A system as in claim 17, wherein said storage means further includes a plurality of magnetic tape drives.

19. A system as in claim 1, wherein said storage means comprises any combination of zero or more optical disk drives, one or more magnetic disk drives, zero or more random access semiconductor memories, and zero or more magnetic tape drives.

20. A system as in claim 1, wherein said server means comprises:

instruction processing means for executing instructions;

main memory means coupled to said instruction processing means for storing said instructions and said selected frames;

input/output channel means coupled to said storage means for accessing said instructions and said selected frames from said storage means;

input/output processing means for retrieving said instructions and said selected frames over said input/output channel means from said storage means; and input/output bus means coupled to said input/output processing means, said instruction processing means, and said main memory means for transferring said instructions and said selected frames from said input/output processing means to said main memory means.

21. A system as in claim 20, wherein said network interface means further comprises:

network input/output processing means coupled to said input/output bus means, for accepting said selected frames from said input/output bus means;

multi-cast interface means coupled to said network input/output processing means for providing a predetermined number of replicated frames from said accepted frames received from said network input/output processing means; and asynchronous transfer mode interface means coupled to said multi-cast interface means and said distribution network means for formatting said replicated frames into one or more transmission packets for transmission over said distribution network means to said decoder.

22. A system as in claim 1, wherein said distribution network means comprises switched integrated-services digital networks.

23. A system as in claim 22, wherein said public switched integrated-services digital networks include asynchronous transfer mode interfaces.

24. A system as in claim 1, wherein said distribution network means comprises fiber distributed data interface networks.

25. A system as in claim 1, wherein said decoder means includes conversion means for converting said replicated frames received from said distribution network means into a selected format for display on the display system.

26. A system as in claim 25, wherein said selected format is for high-definition television.

27. A system as in claim 25, wherein said selected format is an analog signal system compatible with a viewer's display system.

28. A system as in claim 27, wherein said analog signal system is the phase alternating line format.

29. A multi-cast digital video data server system for distributing selected digital video data signals on demand to one or more display systems for viewing by viewers, the system providing to each viewer interactive control over the display of the digital video data signals on a display system, comprising:

a video library to store the digital video data signals, the digital video data signals being grouped into distinct, individually selectable programs, said programs being divided into multiple frames of data signals, said video library including an addressable mass storage device allowing multiple, concurrent accesses to said programs;

a digital video data server coupled to said video library to retrieve selected frames of selected ones of said programs;

a network interface coupled to said digital video data server to accept said selected frames from said digital video data server, replicate said accepted frames a selected number of times, and format each one of said replicated frames into a transmission packet, each said transmission packet being identified for a selected display system;

a distribution network coupled to said network interface to accept said transmission packets from said network interface and distribute said transmission packets to a selected display system;

a decoder coupled to said distribution network and an associated display system to extract said replicated frames from said transmission packets, and to present said replicated frames for real-time display on said associated display system; and a viewer selection device coupled to said digital video data server to interactively communicate viewer requests for digital video data distribution service to said digital video data server.

30. A system as in claim 29, further including a plurality of network interfaces coupled to said digital video data server and said distribution network to accept said selected frames from said digital video data server, replicate said accepted frames a selected number of times according to said viewer requests, and format each one of said replicated frames into a transmission packet, each said transmission packet being identified for a selected display system.

31. A system as in claim 29, further including a plurality of digital video data servers coupled to said video library to retrieve from said video library said selected frames of selected ones of said programs interactively selected by viewers, a plurality of network interfaces, at least one of said network interfaces being coupled to each one of said digital video data servers to accept said selected frames, replicate said accepted frames a selected number of times, and format each one of said replicated frames into a transmission packet, each said transmission packet being identified for a selected display system, and a plurality of viewer selection devices, at least one of said viewer selection devices being coupled to each one of said digital video data servers for interactively communicating said viewer requests for digital video data distribution service.

32. A system as in claim 31, further including a control server coupled to said plurality of digital video data servers for redistributing viewer requests for digital video data distribution service to a selected one of said digital video data servers.

33. A system as in claim 32, wherein said control server includes means for generating viewer billing information.

34. A system as in claim 29, whereby said digital video data server is capable of processing viewer requests in real-time to start, pause, and stop digital video data distribution service, and to modify each requesting viewer's temporal position in said programs.

35. A system as in claim 29, further including a plurality of decoders coupled to said distribution network, each one of said decoders being coupled to a selected display system, for extracting said replicated frames from said transmission packets and for presenting said replicated frames for real-time display on said selected display system.

36. A system as in claim 29, wherein said digital video data signals stored in said video library are encoded and compressed digital video data signals.

37. A system as in claim 36, wherein said decoder includes a video signal processor for decoding and decompressing said replicated frames prior to display on the display system.

38. A system as in claim 29, wherein said viewer selection device is an automated telephone answering device, coupled to said digital video data server and to a telephone at each viewer's site via a public switched telephone network, to interactively communicate viewer requests for digital video data distribution service to said digital video data server.

39. A system as in claim 29, wherein said addressable mass storage device includes a plurality of optical disk drives.

40. A system as in claim 29, wherein said addressable mass storage device includes a plurality of magnetic disk drives.

41. A system as in claim 29, wherein said addressable mass storage device includes a plurality of random access semiconductor memories.

42. A system as in claim 29, wherein said addressable mass storage device includes a plurality of magnetic tape drives.

43. A system as in claim 29, wherein said addressable mass storage device includes any combination of zero or more optical disk drives, one or more magnetic disk drives, zero or more random access semiconductor memories, and zero or more magnetic tape drives.

44. A system as in claim 29, wherein said digital video data server comprises:

an instruction processor to execute instructions;

a main memory module to store said instructions and said selected frames;

a storage controller coupled to said instruction processor and to said main memory to control access to said main memory module;

an input/output bus coupled to said storage controller;

one or more input/output channels coupled to said addressable mass storage device; and an input/output processor coupled to said input/output bus and to said one or more input/output channels to retrieve said instructions and said selected frames from said addressable mass storage device and to transfer said instructions and said selected frames to said main memory module over said input/output bus under the control of said storage controller.

45. A system as in claim 44, wherein said network interface further comprises:

a network input/output processor coupled to said input/output bus to accept said selected frames from said input/output bus;

a multi-cast interface coupled to said network input/output processor to replicate said accepted frames received from said network input/output processor a selected number of times; and an asynchronous transfer mode interface coupled to said multi-cast interface and said distribution network to format said replicated frames into one or more transmission packets for transmission over said distribution network to said decoder.

46. A system as in claim 29, wherein said distribution network comprises switched integrated-services digital networks.

47. A system as in claim 46, wherein said switched integrated-services digital networks include asynchronous transfer mode interfaces.

48. A system as in claim 29, wherein said distribution network comprises fiber distributed data interface networks.

49. A system as in claim 29, wherein said decoder includes a conversion device for converting said replicated frames received from said distribution network into a selected format for display on a display system.

50. A system as in claim 49, wherein said selected format is for high-definition television.

51. A system as in claim 49, wherein said selected format is an analog signal system compatible with a viewer's display system.

52. A system as in claim 51, wherein said analog signal system is the phase alternating line format.

53. A system for distributing selected programs to one or more display systems for viewing by viewers, the system having a video library for storing the programs, the programs being distinct, individually selectable programs and divided into multiple frames of data signals, the video library allowing multiple, concurrent accesses to the programs, the system comprising:

server means coupled to the video library for retrieving selected frames of selected ones of the programs;

multi-cast means coupled to said server means for accepting said selected frames from said server means, for forming a selected number of replicated frames from said accepted frames, and for formatting each one of said replicated frames into a transmission packet, each said transmission packet being identified for a selected display system; and distribution network means coupled to said multi-cast means for accepting said transmission packets from said multi-cast means and for distributing said transmission packets to at least one selected display system.

54. The system of claim 53, wherein said server means comprises:

instruction processing means for executing instructions;

main memory means coupled to said instruction processing means for storing said instructions and said frames;

input/output channel means coupled to the video library for accessing said selected frames from the video library;

input/output processing means for retrieving said selected frames over said input/output channel means from the video library; and input/output bus means coupled to said input/output processing means, said instruction processing means, and said main memory means for transferring said instructions and said selected frames from said input/output processing means to said main memory means.

55. The system of claim 53, wherein said multi-cast means further comprises:

network input/output processing means coupled to said server means, for accepting said selected frames from said server means; and multi-cast interface means coupled to said network input/output processing means for replicating said accepted frames received from said network input/output processing means a selected number of times.

56. The system of claim 55, wherein said multi-cast means further comprises:

asynchronous transfer mode interface means coupled to said multi-cast interface means and said distribution network means for formatting said replicated frames into one or more transmission packets for transmission by said distribution network means.

57. The system of claim 53, wherein said distribution network means includes switched integrated-services digital networks having asynchronous transfer mode interfaces.

58. A system for distributing selected digital video data signals on demand to one or more display systems for viewing by viewers, the system providing to each viewer interactive control over the display of the digital video data signals on a display system, comprising:

storage means for storing the digital video data signals, the digital video data signals being grouped into distinct, individually selectable programs, said programs being divided into multiple frames of data signals, said storage means allowing multiple, concurrent accesses to said programs;

at least one server means coupled to said storage means for retrieving from said storage means selected frames of selected ones of said programs, said at least one server means including
      instruction processing means for executing instructions;
      main memory means coupled to said instruction processing means for storing said instructions and said selected frames;
      input/output channel means coupled to said storage means for accessing said instructions and said selected frames from said storage means;
      input/output processing means for retrieving said instructions and said selected frames over said input/output channel means from said storage means; and
      input/output bus means coupled to said input/output processing means, said instruction processing means, and said main memory means for transferring said instructions and said selected frames from said input/output processing means to said main memory means;

at least one network interface means connected to said at least one server means for accepting said selected frames from said at least one server means, for forming a selected number of replicated frames from said accepted frames, and for formatting each one of said replicated frames into a transmission packet, each said transmission packet being identified for a selected display system, said network interface means including
      network input/output processing means connected to said input/output bus means, for accepting said selected frames from said input/output bus means;
      multi-cast interface means connected to said network input/output processing means for forming a selected number of replicated frames from said accepted frames received from said network input/output processing means; and
      asynchronous transfer mode interface means connected to said multi-cast interface means for formatting said replicated frames into said transmission packets;

distribution network means coupled to said network interface means for accepting said transmission packets from said network interface means and for distributing said transmission packets to at least one selected display system, said distribution network means including switched integrated-services digital networks having asynchronous transfer mode interfaces;

decoder means coupled to said distribution network means and to at least one selected display system for extracting said replicated frames from said transmission packets, and for presenting said replicated frames for real-time display on said at least one selected display system; and viewer selection means coupled to said server means for interactively communicating viewer requests for digital video data distribution service to said server means.

59. A multi-cast digital video data server system for distributing selected digital video data signals on demand to one or more display systems for viewing by viewers, the system providing to each viewer interactive control over the display of the digital video data signals on a display system, comprising:

a video library to store the digital video data signals, the digital video data signals being grouped into distinct, individually selectable programs, said programs being divided into multiple frames of data signals, said video library including at least one addressable mass storage device allowing multiple, concurrent accesses to said programs;

at least one digital video data server connected to said video library to retrieve selected frames of selected ones of said programs, said at least one digital video data server including at least one instruction processor to execute instructions;

a main memory module to store said instructions and said selected frames;

a storage controller connected to said at least one instruction processor and to said main memory to control access to said main memory module;

an input/output bus connected to said storage controller;

a plurality of input/output channels connected to said at least one addressable mass storage device; and at least one input/output processor connected to said input/output bus and to said plurality of input/output channels to retrieve said instructions and said selected frames from said at least one addressable mass storage device and to transfer said instructions and said selected frames to said main memory module over said input/output bus under the control of said storage controller;

at least one network interface connected to said digital video data server to accept said selected frames from said digital video data server, form a selected number of replicated frames from said accepted frames, and format each one of said replicated frames into a transmission packet, each said transmission packet being identified for a selected display system, said at least one network interface including at least one network input/output processor connected to said input/output bus to accept said selected frames from said input/output bus;

at least one multi-cast interface connected to said at least one network input/output processor to form a selected number of replicated frames from said accepted frames received from said at least one network input/output processor; and at least one asynchronous transfer mode interface connected to said at least one multi-cast interface to format said replicated frames into transmission packets;

a distribution network connected to said at least one network interface to accept said transmission packets from said at least one network interface and distribute said transmission packets to a selected display system, said distribution network including switched integrated-services digital networks having asynchronous transfer mode interfaces;

a decoder connected to said distribution network and an associated display system to extract said replicated frames from said transmission packets, and to present said replicated frames for real-time display on said associated display system; and a viewer selection device connected to said digital video data server to interactively communicate viewer requests for digital video data distribution service to said digital video data server.

* * * * *